United States Patent
Chen

(10) Patent No.: US 7,901,242 B2
(45) Date of Patent: Mar. 8, 2011

(54) POWER SUPPLY APPARATUS AND MODULAR POWER CONNECTION INTERFACE THEREOF

(75) Inventor: Hung-Chuan Chen, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 134 days.

(21) Appl. No.: 12/244,202

(22) Filed: Oct. 2, 2008

(65) Prior Publication Data

US 2009/0327768 A1 Dec. 31, 2009

(30) Foreign Application Priority Data

Jun. 27, 2008 (TW) ............................ 97124308 A

(51) Int. Cl.
*H01R 11/00* (2006.01)
(52) U.S. Cl. ........................................................ 439/502
(58) Field of Classification Search .................. 439/502, 439/623, 76.1, 505, 883
See application file for complete search history.

(56) References Cited

U.S. PATENT DOCUMENTS

| 5,855,064 | A | * | 1/1999 | Chang | 29/861 |
| 5,880,936 | A | * | 3/1999 | Anderson | 361/752 |
| 6,129,598 | A | * | 10/2000 | Yu et al. | 439/883 |
| 6,623,278 | B2 | * | 9/2003 | Follingstad et al. | 439/64 |
| 2006/0046534 | A1 | * | 3/2006 | Birmingham | 439/76.1 |
| 2008/0318478 | A1 | * | 12/2008 | Nelson et al. | 439/620.01 |

* cited by examiner

*Primary Examiner* — Briggitte R Hammond
*Assistant Examiner* — Larisa Z Tsukerman
(74) *Attorney, Agent, or Firm* — Kirton & McConkie; Evan R. Witt

(57) ABSTRACT

A power supply apparatus includes a power converting circuit and a modular power connection interface. By the power converting circuit, an input voltage is converted into several output voltages required for powering corresponding electronic devices. The modular power connection interface includes an output member and a connecting member. The output member includes a plurality of pins and a daughter board. The pins are arranged on at least one surface of the daughter board and electrically connected to the power converting circuit so as to transmit the output voltages. The connecting member has a first connecting part and multiple second connecting parts. The first connecting part is electrically connected with the pins of the output member, and the second connecting parts are electrically connected with corresponding electronic devices, so that the output voltages are transmitted from the power converting circuit to the electronic devices through the modular power connection interface.

20 Claims, 11 Drawing Sheets

POWER SUPPLY APPARATUS AND MODULAR POWER CONNECTION INTERFACE THEREOF

FIELD OF THE INVENTION

The present invention relates to a power supply apparatus and a power connection interface thereof, and more particularly to a power supply apparatus and a modular power connection interface thereof.

BACKGROUND OF THE INVENTION

Power supply apparatuses are essential for many electronic appliances such as personal computers to provide power required to operate the personal computers.

FIG. 1 is a schematic partial perspective view illustrating a conventional power supply apparatus. The power supply apparatus 1 has a power connection interface 11. The power connection interface 11 comprises a plurality of wires 111. The wires 111 have first terminals connected to corresponding insertion elements 112a~112e. The insertion elements 112a~112e may be identical or different. The second terminals of the wires 111 are penetrated through a perforation 101 of the case 10 of the power supply apparatus 1 and electrically connected to a power output interface of a power converting circuit (not shown) within the case 10 of the power supply apparatus 1 by for example welding. When the insertion elements 112a~112e are inserted into corresponding insertion slots of certain electronic devices such as optical disc drives, hard disc drives and the like, the electricity provided by the power supply apparatus 1 will be transmitted to these electronic devices through the power connection interface 11.

The power connection interface 11 of the power supply apparatus 1, however, still has some drawbacks. For example, since the second terminals of the wires 111 are welded on the power output interface of the power converting circuit within the case 10 of the power supply apparatus 1 and the first terminals of the wires 111 are fixed onto the insertion elements 112a~112e, the flexibility of using the power connection interface 11 is restricted. In a case that the insertion slots of some electronic devices do not comply with either of the insertion elements 112 or the number of electronic devices exceeds the number of the insertion elements 112, these electronic devices will malfunction. For solving these drawbacks, the power connection interface 11 needs to be adjusted or the power supply apparatus 1 needs to be replaced with another type. Under this circumstance, the applications of the power supply apparatus 1 are restricted by the power connection interface 11. Moreover, since the second terminals of the wires 111 are welded on and electrically connected to the power output interface within the power connection interface 11, the impedance generated at the welding portion usually increases the energy loss.

Therefore, there is a need of providing a power supply apparatus and a modular power connection interface thereof so as to obviate the drawbacks encountered from the prior art.

SUMMARY OF THE INVENTION

It is an object of the present invention to provide a power supply apparatus and a modular power connection interface thereof so as to increase the using flexibility.

Another object of present invention provides a modular power connection interface with reduced energy loss at the welding portion.

A further object of present invention provides a power supply apparatus with reduced number of wires or connectors.

In accordance with an aspect of the present invention, there is provided a power supply apparatus disposed in an electronic appliance with multiple electronic devices. The power supply apparatus includes a power converting circuit and a modular power connection interface. By the power converting circuit, an input voltage is converted into several output voltages required for powering corresponding electronic devices. The modular power connection interface includes an output member and a connecting member. The output member includes a plurality of pins and a daughter board. The pins are arranged on at least one surface of the daughter board and electrically connected to the power converting circuit so as to transmit the output voltages. The connecting member mates with the electronic devices, and has a first connecting part corresponding to the output member and multiple second connecting parts corresponding to the electronic devices. The first connecting part is electrically connected with the pins of the output member, and the second connecting parts are electrically connected with corresponding electronic devices, so that the output voltages are transmitted from the power converting circuit to the electronic devices through the output member and the connecting member.

In accordance with another aspect of the present invention, there is provided a modular power connection interface for use in a power supply apparatus. The power supply apparatus is electrically connected with multiple electronic devices of an electronic appliance. The power supply apparatus has a power converting circuit for converting an input voltage into several output voltages required for powering corresponding electronic devices. The modular power connection interface includes an output member and a connecting member. The output member includes a plurality of pins and a daughter board. The pins are arranged on at least one surface of the daughter board and electrically connected to the power converting circuit so as to transmit the output voltages. The connecting member mates with the electronic devices, and has a first connecting part corresponding to the output member and multiple second connecting parts corresponding to the electronic devices. The first connecting part is electrically connected with the pins of the output member, and the second connecting parts are electrically connected with corresponding electronic devices, so that the output voltages are transmitted from the power converting circuit to the electronic devices through the output member and the connecting member.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
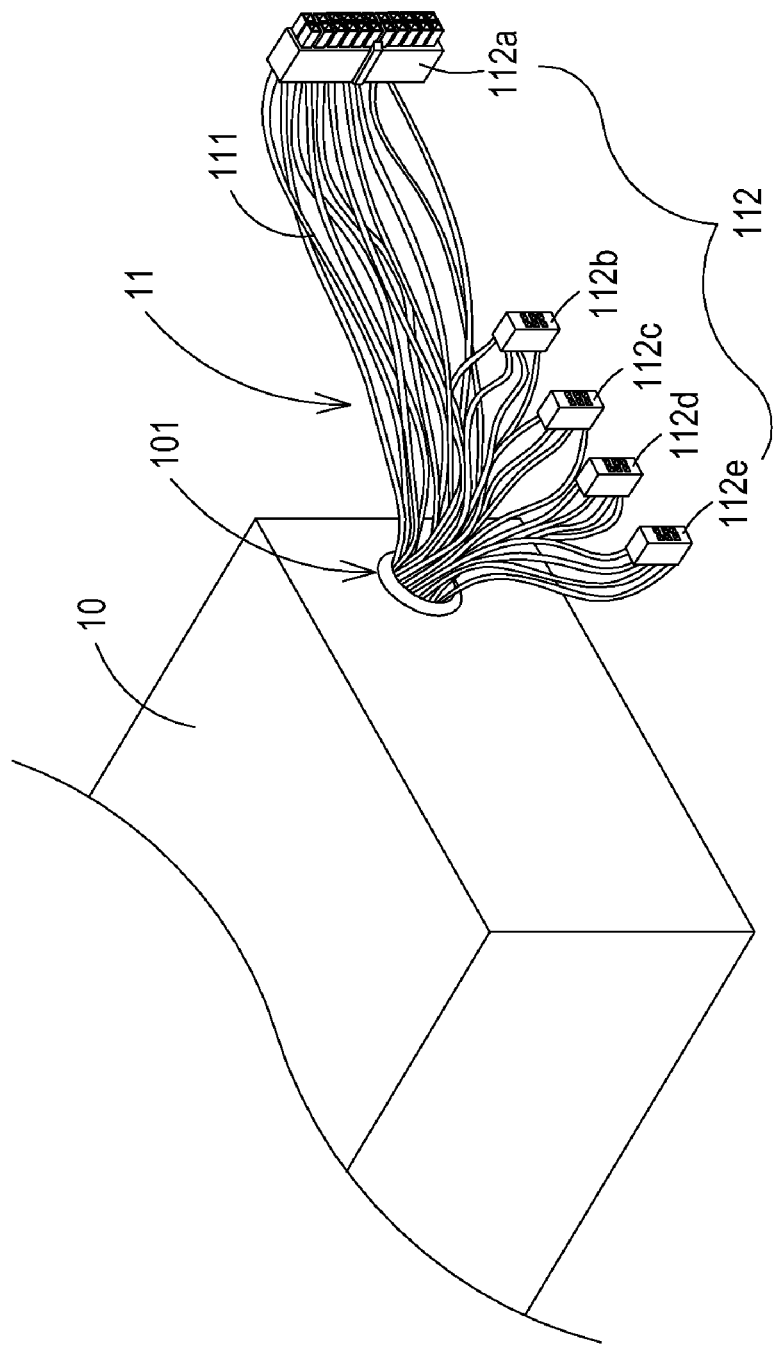
FIG. 1 is a schematic partial perspective view illustrating a conventional power supply apparatus.
Figure 2A:
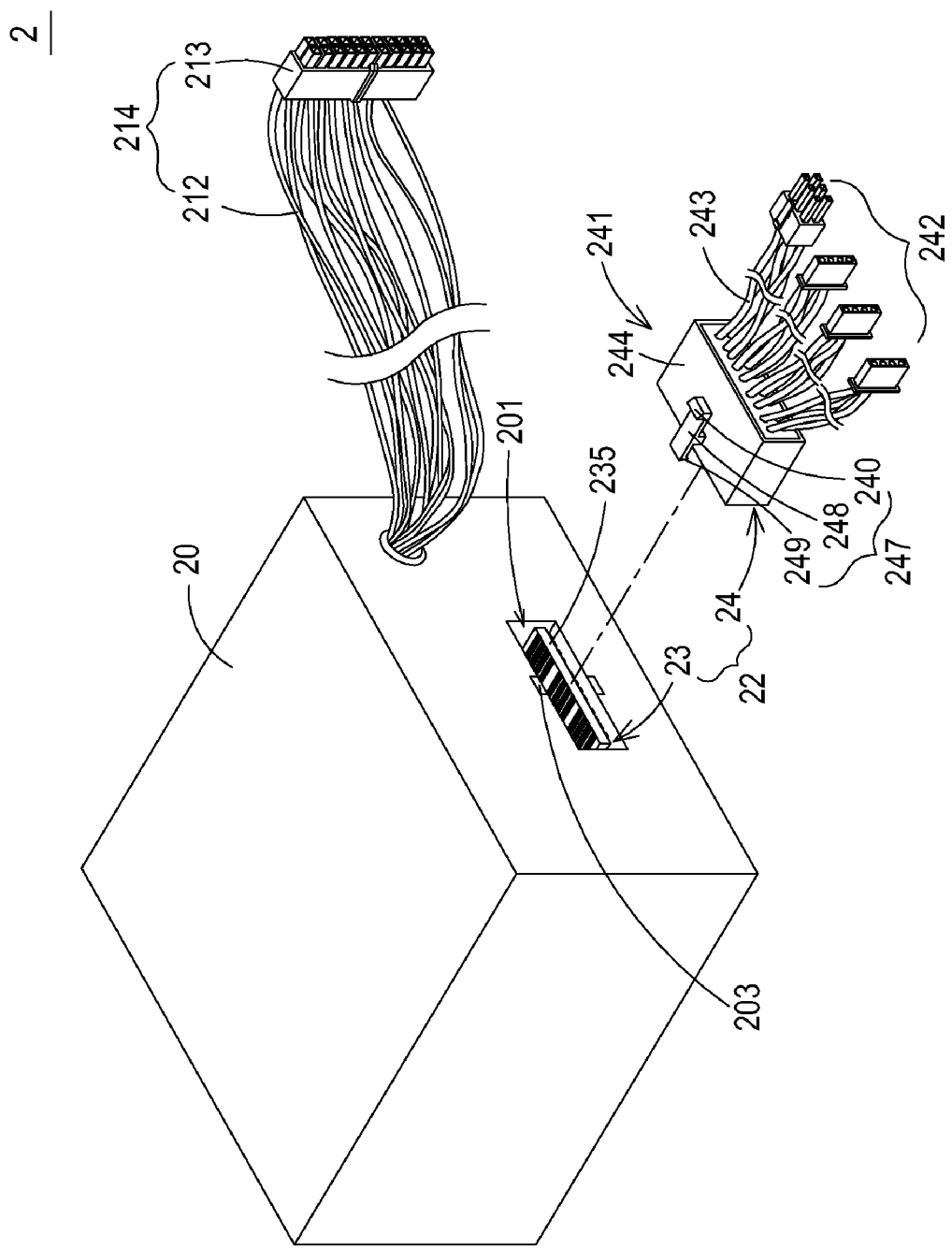
FIG. 2A is a schematic exploded view illustrating a power supply apparatus according to a first preferred embodiment of the present invention.
Figure 2B:
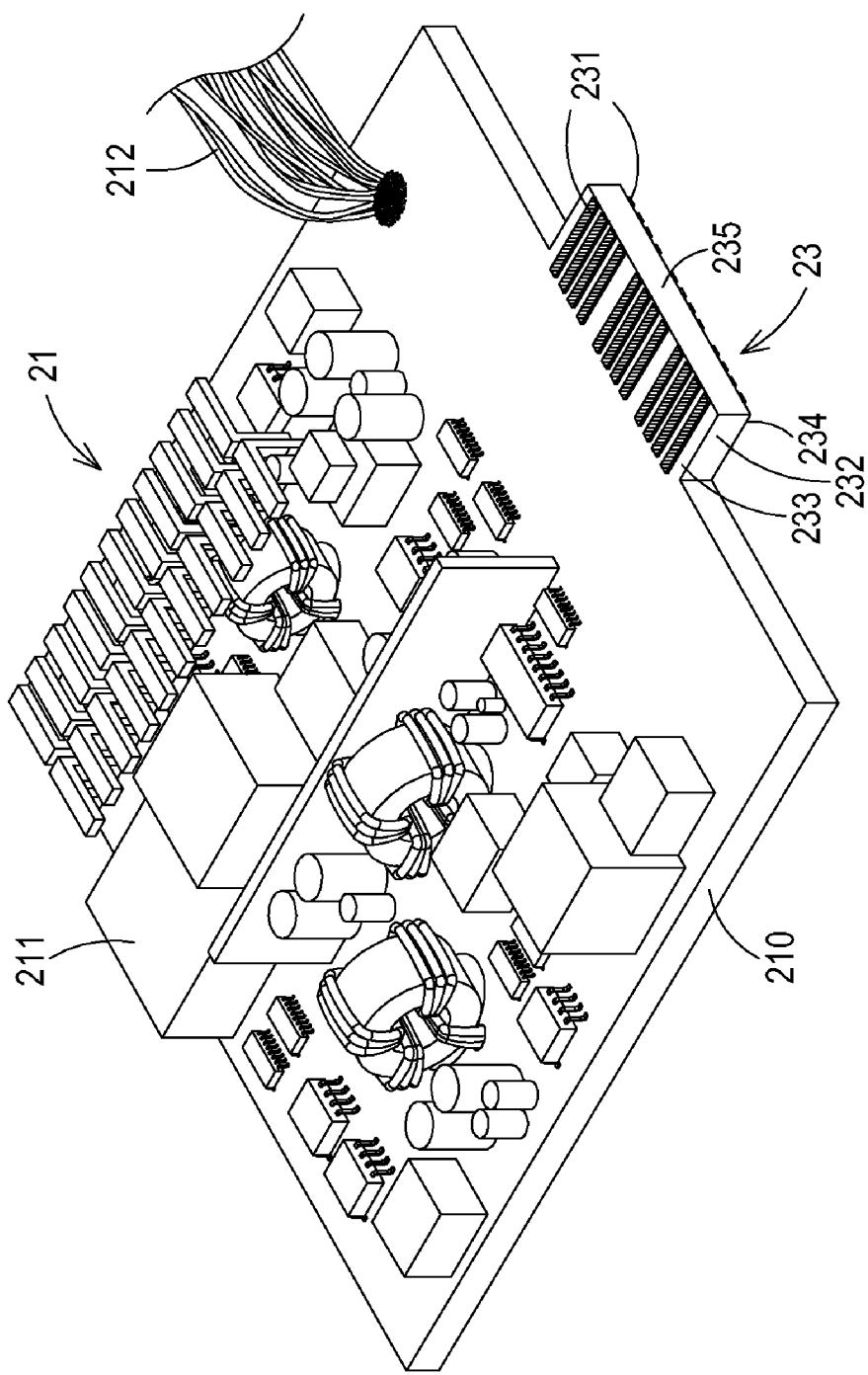
FIG. 2B is a schematic perspective view illustrating the power converting circuit and an output member of the modular power connection interface of the power supply apparatus shown in FIG. 2A.
Figure 3:
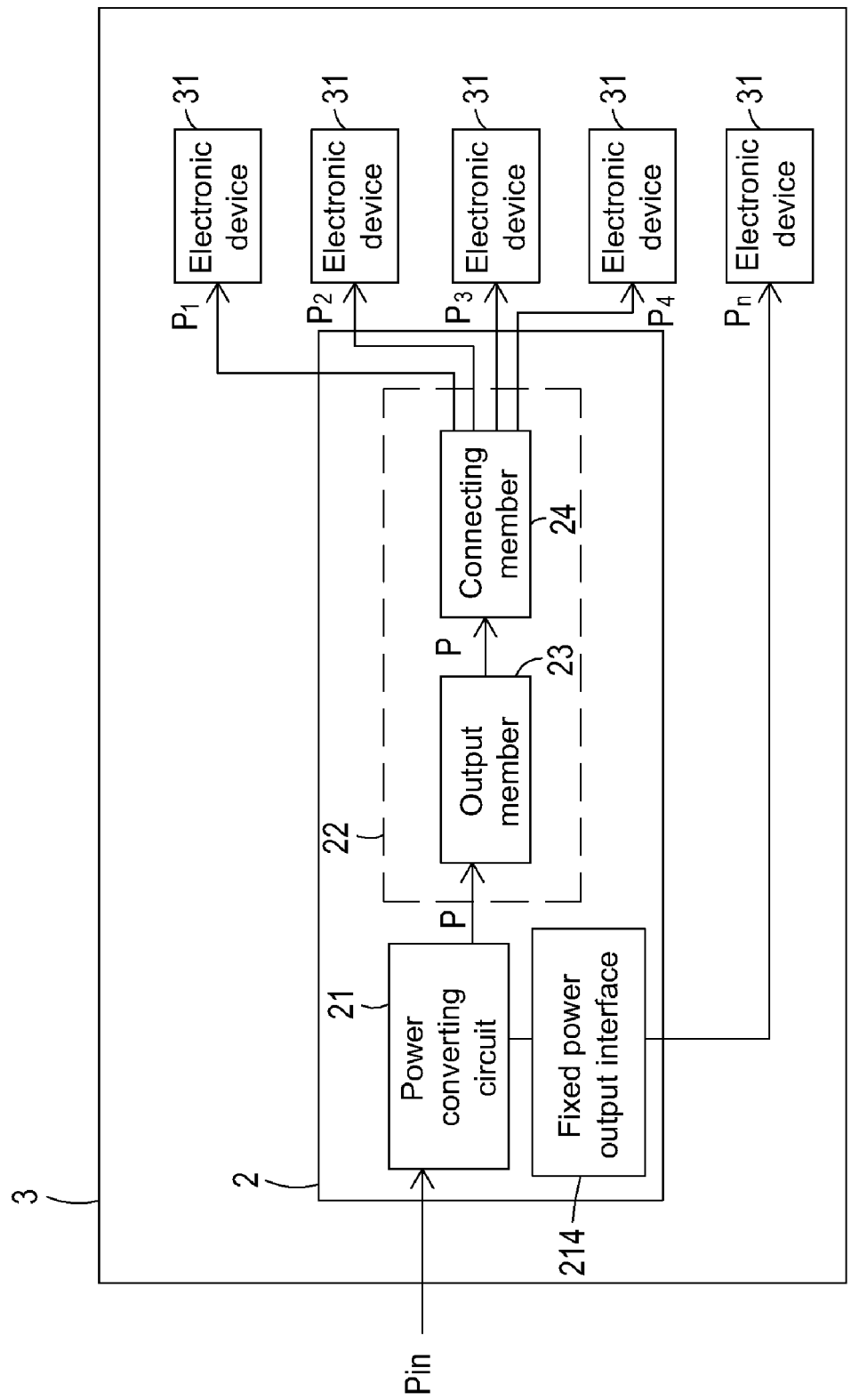
FIG. 3 is a schematic circuit block diagram illustrating an electronic appliance having the power supply apparatus of the present invention.

FIG. 2A is a schematic exploded view illustrating a power supply apparatus according to a first preferred embodiment of the present invention. The power supply apparatus 2 principally comprises a power converting circuit 21 (as shown in FIG. 2B), a modular power connection interface 22 and a case 20. The power supply apparatus 2 may be disposed inside an electronic appliance (e.g. a personal computer) in order to power the electronic devices 31 contained in the electronic appliance 3 (as shown in FIG. 3).

FIG. 2B is a schematic perspective view illustrating the power converting circuit and an output member of the modular power connection interface of the power supply apparatus shown in FIG. 2A. FIG. 3 is a circuit diagram of the electronic appliance having the power supply apparatus of the present invention. In this embodiment, the power converting circuit 21 of the power supply apparatus 2 includes an AC-to-DC converting circuit and a DC-to-DC converting circuit. As shown in FIG. 2B, the power converting circuit 21 is mounted on a printed circuit board 210. An input voltage $P_{in}$ (e.g. utility power) is received by the power converting circuit 21 through a power socket 211. The input voltage $P_{in}$ is converted by the power converting circuit 21 into several output voltages P required for powering corresponding electronic devices 31. The output voltages P include for example 3.3V, 5V and 12V. As shown in FIGS. 2A and 2B, the first terminals of the power wires 212 are welded on a predetermined location of the printed circuit board 210 so as to be electrically connected to a power output interface (not shown) of the printed circuit board 210. In addition, the second terminals of the power wires 212 are connected to an insertion element 213. The power wires 212 and the insertion element 213 collectively define as a fixed power output interface 214 for outputting a specified DC voltage.

Please refer to FIGS. 2A and 2B again. The modular power connection interface 22 of the power supply apparatus 2 includes the output member 23 and a connecting member 24. The output member 23 has multiple pins 231. These pins 231 are conductive sheets made of metallic material (e.g. copper) and attached on at least one surface of the daughter board 232 of the output member 23 in parallel with each other. In this embodiment, the daughter board 232 is also a printed circuit board, which is arranged on an edge of the printed circuit board 210. Preferably, the daughter board 232 is integrally formed with the printed circuit board 210. The daughter board 232 of the output member 23 may be considered as a portion of the printed circuit board 210 and extended from the edge of the printed circuit board 210. In addition, the pins 231 of the output member 23 are electrically connected with the power converting circuit 21 through the trace patterns on the daughter board 232 and the printed circuit board 210. In other words, the output member 23 of the modular power connection interface 22 is a gold finger interface (or an edge connector). The output voltages P generated by the power converting circuit 21 will be transmitted to the corresponding electronic devices 31 through the pins 231 of the output member 23.

Please refer to FIG. 2B again. The daughter board 232 of the output member 23 of the modular power connection interface 22 has a first surface 233 (top surface) and a second surface 234 (bottom surface). In this embodiment, the pins 231 of the output member 23 are arranged on the first surface 233 and the second surface 234 of the daughter board 232. The pins 231 arranged on the first surface 233 are disposed on the locations corresponding to the pins 231 arranged on the second surface 234. The output voltages P to be transmitted through the pins 231 on the first surface 233 and the second surface 234 may be identical or different. Alternatively, the pins 231 arranged on the first surface 233 and the pins 231 arranged on the second surface 234 are asymmetrically arranged on the first surface 233 and the second surface 234 of the daughter board 232. In some embodiments, the pins 231 are arranged on either the first surface 233 or the second surface 234. The arrangement of the pins 231 is not restricted as long as the arrangement conforms to the electrical safety regulations.

Figure 2C:
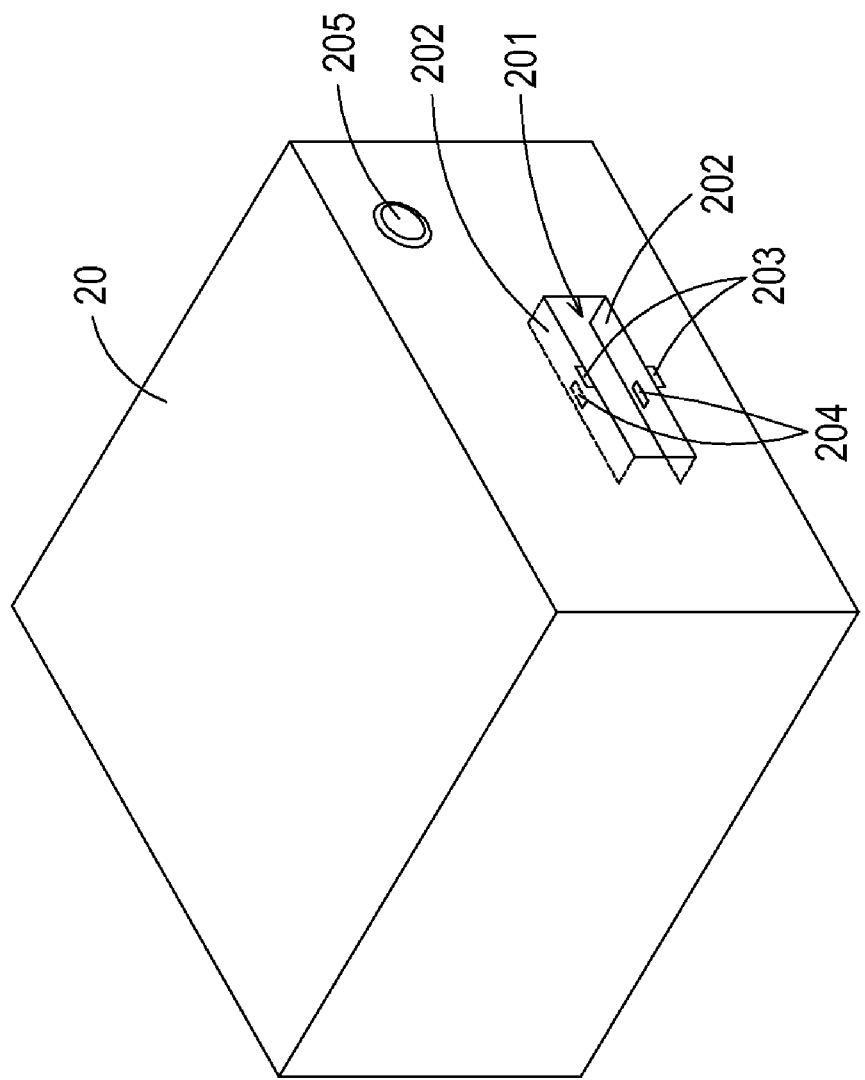
FIG. 2C is a schematic perspective view illustrating the case of the power supply apparatus shown in FIG. 2A.

FIG. 2C is a schematic perspective view illustrating the case of the power supply apparatus shown in FIG. 2A. Please refer to FIGS. 2A and 2C again. The case 20 of the power supply apparatus 2 has a rectangular shape. Corresponding to the output member 23 of the modular power connection interface 22, an opening 201 is formed in a sidewall of the case 20. By partially cutting the sidewall of the case 20 and bending the cut portion inward the case 20, the opening 201 and two extension pieces 202 are simultaneously formed. In this embodiment, the extension pieces 202 are extended from two opposite edges of the opening 201. Through the opening 201, the output member 23 of the modular power connection interface 22 is exposed outside of the case 20. In addition, at least one first hole 203 is formed in the case 20 adjacent to the opening 201; and at least one second hole 204 is formed in the extension piece 202. In this embodiment, the case 20 has two extension pieces 202, two first holes 203 and two second holes 204. Alternatively, the case 20 may have one extension piece 202, one first hole 203 and one second hole 204. In addition, a perforation 205 is formed in the case 20. The power wires 212 of the fixed power output interface 214 may be penetrated through the perforation 205 and welded on the predetermined location of the printed circuit board 210.

Please refer to FIGS. 2B, 2C and 2A again. The printed circuit board 210 is integrally formed with the daughter board 232 of the output member 23 of the modular power connection interface 22. The printed circuit board 210 and the daughter board 232 are both received in the receptacle within the case 20. A sidewall 235 between the first surface 233 and the second surface 234 is substantially aligned with the periphery of the opening 201 of the case 20. In other words, the output member 23 of the modular power connection interface 22 is not protruded outside the case 20. Furthermore, corresponding to the power socket 211, another opening (not shown) is formed in the case 2 so that a plug may be inserted into the power socket 211 through the opening to transmit the input voltage $P_{in}$ to the hollow power socket 211.

Figure 2D:
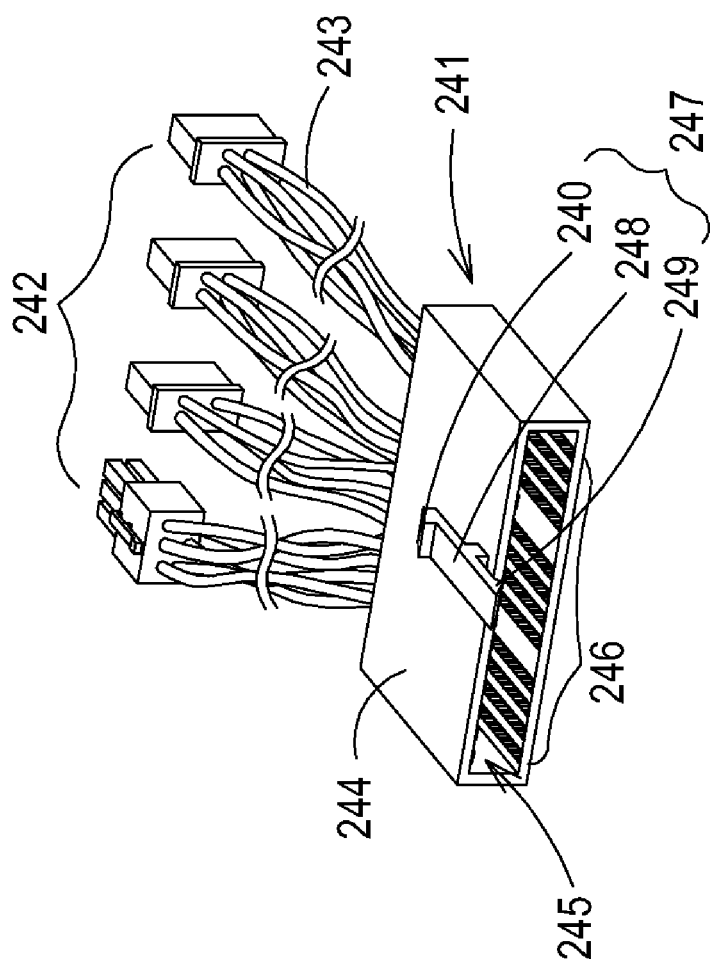
FIG. 2D is a schematic perspective view illustrating the connecting member of the power supply apparatus shown in FIG. 2A.

FIG. 2D is a schematic perspective view illustrating the connecting member of the power supply apparatus shown in FIG. 2A. Please refer to FIGS. 2A and 2D. The connecting member 24 has a first connecting part 241 and several second connecting parts 242. The first connecting part 241 faces the output member 23 of the modular power connection interface 22. The first connecting part 241 and the second connecting parts 242 are structurally and electrically connected with each other through wires 243. The first connecting part 241 of the connecting member 24 has a main body 244, which is made of plastic material and has a rectangular shape. The dimension and size of the main body 244 substantially mates with the opening 201 of the case 20. In addition, the main body 244 has a receiving recess 245, which is depressed from a side of the main body 244. The dimension and size of the receiving recess 245 substantially mates with the daughter board 232 of the output member 23 of the modular power connection interface 22. Corresponding to the pins 231 on the first surface 233 and the second surface 234 of the output member 23, a plurality of conducting parts 246 are formed within the receiving recess 245. In a case that the pins 231 are arranged on the first surface 233 and the second surface 234 of the output member 23, the conducting parts 246 are formed on two opposite inner walls of the receiving recess 245. When the first connecting part 241 of the connecting member 24 is coupled with the output member 23 of the modular power connection interface 22, the daughter board 232 of the output member 23 is accommodated within the receiving recess 245 and the pins 231 of the output member 23 is contacted and electrically with the conducting parts 246.

Please refer to FIGS. 2A and 2D again. The second connecting parts 242 of the connecting member 24 are identical or different types of insertion elements such as plugs. In this embodiment, the connecting member 24 has four second connecting parts 242, which include at least two types of plugs. For example, the connecting member 24 has three large-sized 4-pin plugs and one 6-pin plug. It is understood that the number and types of the second connecting parts 242 of the connecting member 24 are not restricted but may be varied according to the insertion slots of the electronic devices 31 contained in the electronic appliance 3.

Please refer to FIG. 2D again. A resilient hooking element 247 is formed on the main body 244 of the first connecting part 241 of the connecting member 24. The resilient hooking element 247 includes a slab 248 and a hook 249. The slab 248 is disposed on the main body 244 such that a gap is defined between the slab 248 and the main body 244. The hook 249 is extended from an end of the slab 248 and disposed on a first side of the slab 248. The locations of the slab 248 and the hook 249 of the resilient hooking element 247 correspond to the locations of the first hole 203 and the second hole 204 of the case 20, respectively. The resilient hooking element 247 further comprises a raised block 240, which is extended from the other end of the slab 248 and disposed on a second side of the slab 248. In response to a depressing force exerted on the raised block 240, the hook 249 is slightly moved toward the direction distant from the main body 244. According to the user's requirement, the resilient hooking element 247 may be arranged on the top surface or the bottom surface of the main body 244.

Figure 2E:
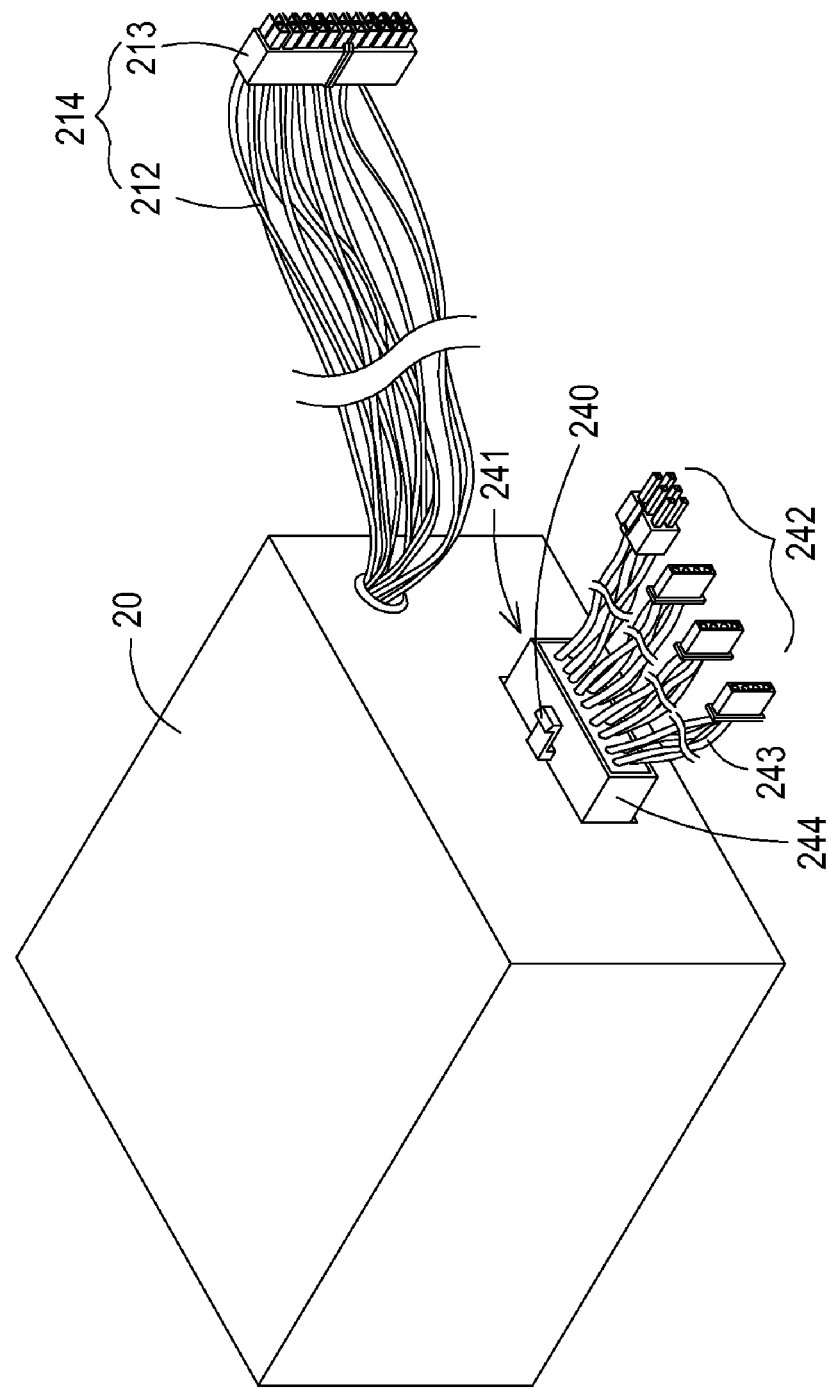
FIG. 2E is a schematic assembled view of the power supply apparatus shown in FIG. 2A.

FIG. 2E is a schematic assembled view of the power supply apparatus shown in FIG. 2A. Please refer to FIGS. 2A, 2D and 2E. For assembling the modular power connection interface 22 by coupling the connecting member 24 with the output member 23, the first connecting part 241 of the connecting member 24 is partially embedded into the opening 201 such that the daughter board 232 of the output member 23 is accommodated in the receiving recess 245 of the first connecting part 241. Meanwhile, the conducting parts 246 on the inner walls of the receiving recess 245 are contacted with corresponding pins 231 on the daughter board 232 of the output member 23, so that the conducting parts 246 and the pins 231 are electrically connected with each other. Furthermore, the slab 248 of the resilient hooking element 247 of the connecting member 24 is penetrated through the first hole 203 of the case 20 such that the hook 249 of the resilient hooking element 247 is engaged with the second hole 204 in the extension piece 202 of the case 20 and the extension piece 202 of the case 20 is partially received in the gap between the slab 248 and the main body 244. The engagement between the hook 249 and the second hole 204 may facilitate secure combination between the first connecting part 241 of the connecting member 24 and the output member 23 and prevent detachment of the first connecting part 241 from the output member 23. Under this circumstance, the power supply apparatus is assembled as shown in FIG. 2E.

On the other hand, for detaching the connecting member 24 from the output member 23, a depressing force exerted on the raised block 240 such that the hook 249 is slightly moved toward the direction distant from the main body 244. Meanwhile, the hook 249 of the resilient hooking element 247 is disengaged from the second hole 204 and thus the user may detach the connecting member 24 from the output member 23. Since it is easy to combine the output member 23 and the connecting member 24 of the modular power connection interface 22, the connecting member 24 may be modified or replaced according to the corresponding electronic devices 31 contained in the electronic appliance 3, thereby transmitting regulated power required for the electronic devices 31.

FIG. 3 is a schematic circuit block diagram illustrating an electronic appliance having the power supply apparatus of the present invention. Please refer to FIGS. 2 and 3. The power supply apparatus 2 and the modular power connection interface 22 are disposed within the electronic appliance 3. The power converting circuit 21 is mounted on a printed circuit board 210. Through a power socket 211 on the printed circuit board 210, an input voltage $P_{in}$ (e.g. utility power) is received by the power converting circuit 21. The input voltage $P_{in}$ is converted by the power converting circuit 21 into several output voltages P required for powering corresponding electronic devices 31. For example, the output voltages P includes $P_1, P_2, P_3, P_4, \ldots, P_n$. The output voltages P include for example 3.3V, 5V and 12V. According to the manufacturer's design of the power converting circuit 21, the magnitudes of the $P_1, P_2, P_3, P_4, \ldots, P_n$ are identical or different. In addition, the pins 231 of the output member 23 are electrically connected with the power converting circuit 21 through the trace patterns on the daughter board 232 and the printed circuit board 210. The first connecting part 241 and the second connecting parts 242 of the connecting member 24 are electrically connected to the output member 23 and the electronic devices 31, respectively. As a consequence, the power supply apparatus 2 will transmit the output voltages $P_1, P_2, P_3$ and $P_4$ to the electronic devices 31 through the output member 23 and the connecting member 24 of the modular power connection interface 22. In addition, the first terminals of the power wires 212 are welded on the predetermined location of the printed circuit board 210. The insertion element 213 of the fixed power output interface 214 is connected to one of the electronic devices 31. Examples of the electronic devices 31 include for example a main board, a hard disc drive, an optical disc drive, a transmission card, a sound card, a memory card, a video card, a network card and a heat-dissipating device.

Since it is easy to combine the output member 23 and the connecting member 24 of the modular power connection interface 22, the connecting member 24 may be modified or replaced according to the corresponding electronic devices 31 contained in the electronic appliance 3, thereby transmitting regulated power required for the electronic devices 31. That is, if the electronic devices 31 contained in the electronic appliance 3 are changed, a new connecting member 24 of the modular power connection interface 22 is used, in which the first connecting part 241 and the second connecting parts 242 of the connecting member 24 are electrically connected to the output member 23 and the electronic devices 31, respectively. As previously described, since the insertion elements of the conventional power connection interface are unchangeable, the flexibility of using the conventional power connection interface is restricted. Whereas, the connecting member 24 of the modular power connection interface 22 of the present invention is replaceable and thus the flexibility of using the modular power connection interface is enhanced. Moreover, since the output member 23 is electrically connected with the power converting circuit 21 through the trace patterns on the daughter board 232 and the printed circuit board 210, the problem of causing energy loss at the welding portion encountered from the prior art will be overcome. In addition, the fabricating process is simplified and the efficiency of the power supply apparatus is increased.

Figure 4:
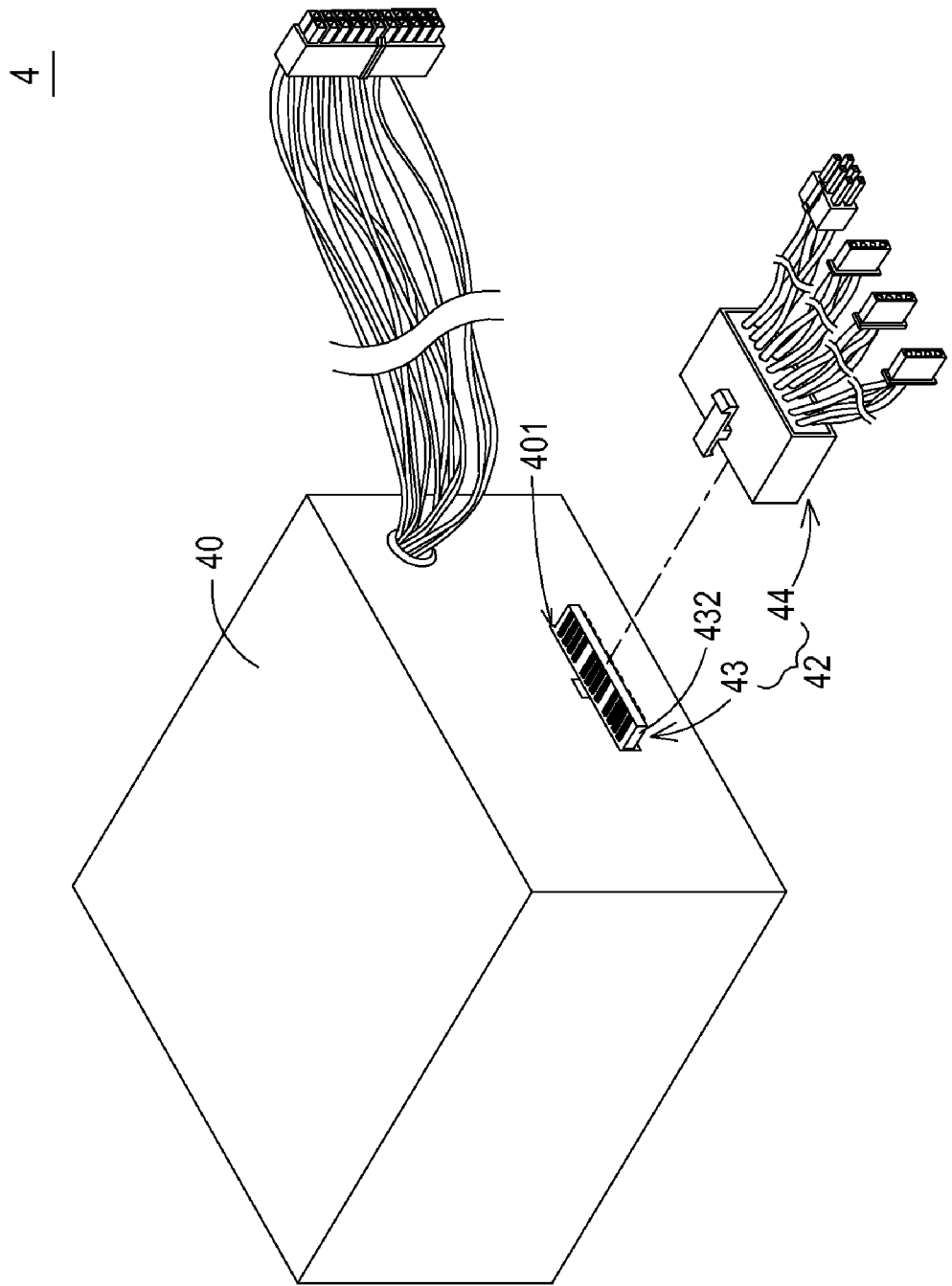
FIG. 4 is a schematic assembled view of a power supply apparatus shown according to a second preferred embodiment of the present invention.

FIG. 4 is a schematic assembled view of a power supply apparatus shown according to a second preferred embodiment of the present invention. The power supply apparatus 4 principally comprises a power converting circuit (not shown), a modular power connection interface 42 and a case 40. The power converting circuit is also disposed within the case 40 and mounted on a printed circuit board (not shown). The connection between the daughter board 432 of the output member 43 of the modular power connection interface 42 is similar to that shown in FIG. 2B, and is not redundantly described herein. The configuration of the connecting member 44 of the modular power connection interface 42 is similar to those shown in FIG. 2D and the configuration of the case 40 is similar to those shown in FIG. 2C.

In this embodiment, the daughter board 432 of the output member 43 of the modular power connection interface 42 is protruded outside the case 40 through the opening 401. The dimension of the opening 401 of the case 40 is substantially the same as the cross section of the daughter board 432 of the output member 43. The other components of the power supply apparatus 4 and the relations between the power supply apparatus 4 and the electronic appliance 3 are similar to those shown in FIG. 3, and are not redundantly described herein.

Figure 5A:
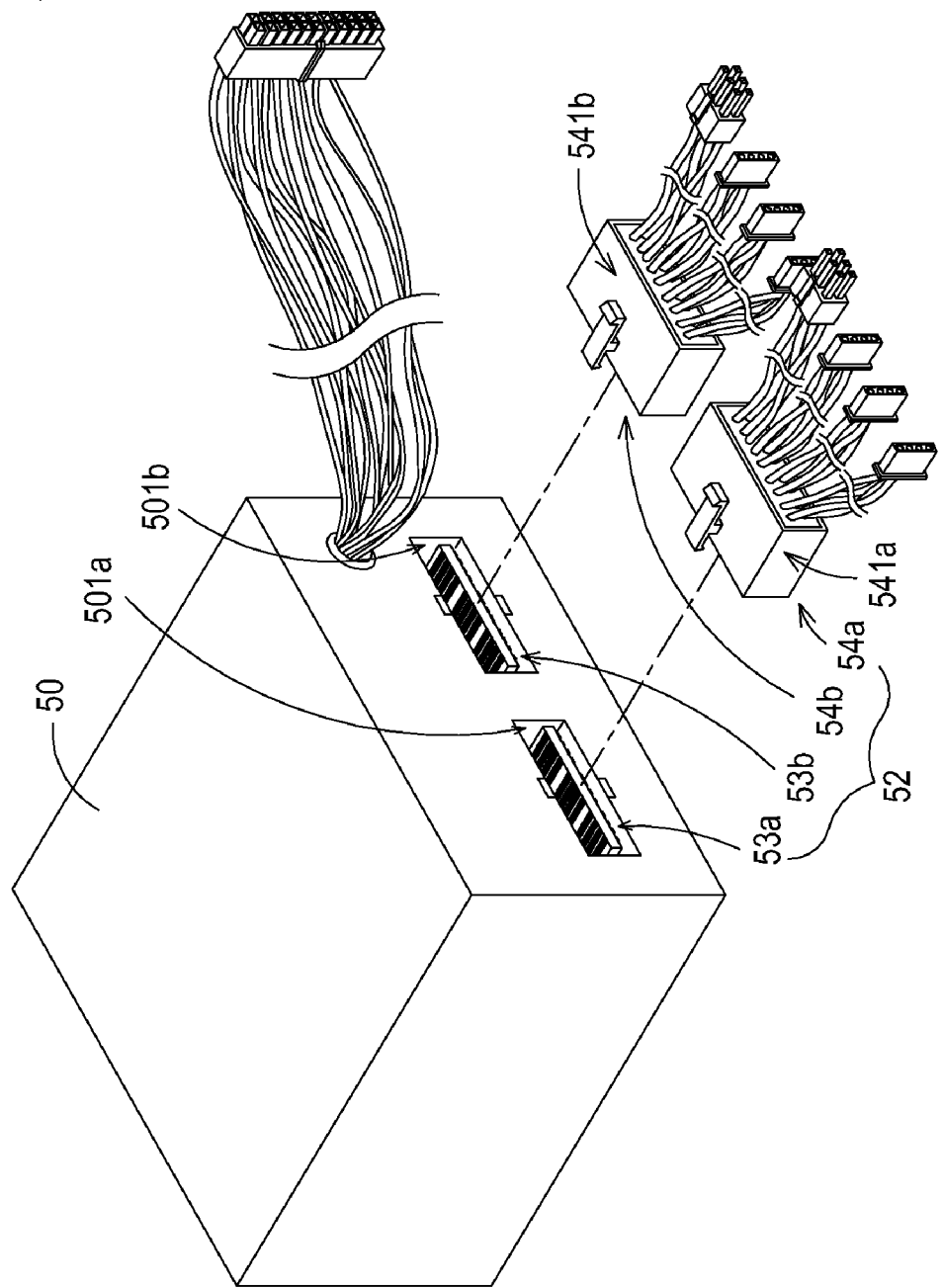
FIG. 5A is a schematic exploded view illustrating a power supply apparatus according to a third preferred embodiment of the present invention.
Figure 5B:
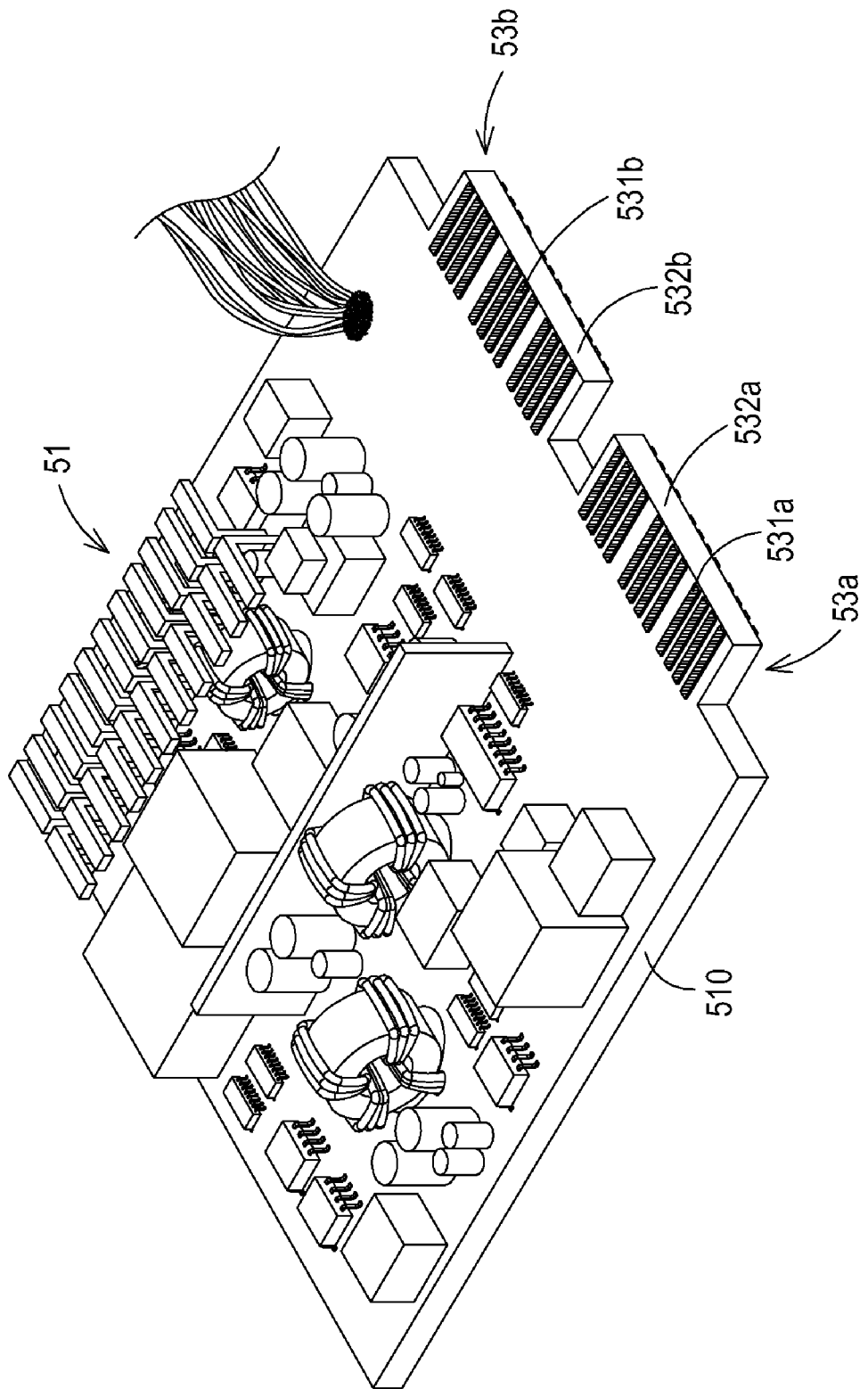
FIG. 5B is a schematic perspective view illustrating the power converting circuit and an output member of the modular power connection interface of the power supply apparatus shown in FIG. 5A.

FIG. 5A is a schematic exploded view illustrating a power supply apparatus according to a third preferred embodiment of the present invention. FIG. 5B is a schematic perspective view illustrating the power converting circuit and an output member of the modular power connection interface of the power supply apparatus shown in FIG. 5A. The power supply apparatus 5 principally comprises a power converting circuit 51, a modular power connection interface 52 and a case 50. The power converting circuit 51 is also disposed within the case 50 and mounted on a printed circuit board 510. In this embodiment, the modular power connection interface 52 comprises two output members 53a and 53b. The output members 53a and 53b have multiple pins 531a and 531b, respectively. The pins 531a are attached on at least one surface of the daughter board 532a of the output member 53a. The pins 531b are attached on at least one surface of the daughter board 532b of the output member 53b. The output members 53a and 53b are horizontally extended from a same edge of the printed circuit board 510 and parallel with each other. The relations between the daughter boards 532a/532b, the pins 531a/531b and the power converting circuit 51 are similar to those illustrated in the first preferred embodiment, and are not redundantly described herein.

Please refer to FIGS. 5A and 5B again. The daughter boards 532a and 532b of the output members 53a and 53b are integrally formed with the printed circuit board 510. Corresponding to the daughter boards 532a and 532b of the modular power connection interface 52, the case 50 further comprises openings 501a and 501b, respectively. The modular power connection interface 52 further comprises two connecting members 54a and 54b.

The first connecting parts 541a and 541b of the connecting members 54a and 54b faces the output members 53a and 53b of the modular power connection interface 52, respectively. The relations between the case 50, the power converting circuit 51, the output members 53a/53b of the modular power connection interface 52 and the connecting members 54a and 54b, and the relations between the power supply apparatus 5 and the electronic appliance are similar to those shown in the first preferred embodiment, and are not redundantly described herein.

It is known from the third preferred embodiment that the number of the output members of the modular power connection interface may be varied according to the practical requirements. As the number of the output members is increased in the horizontal direction, the number of corresponding connecting members is increased such that the power supply apparatus may power more electronic devices.

Figure 6:
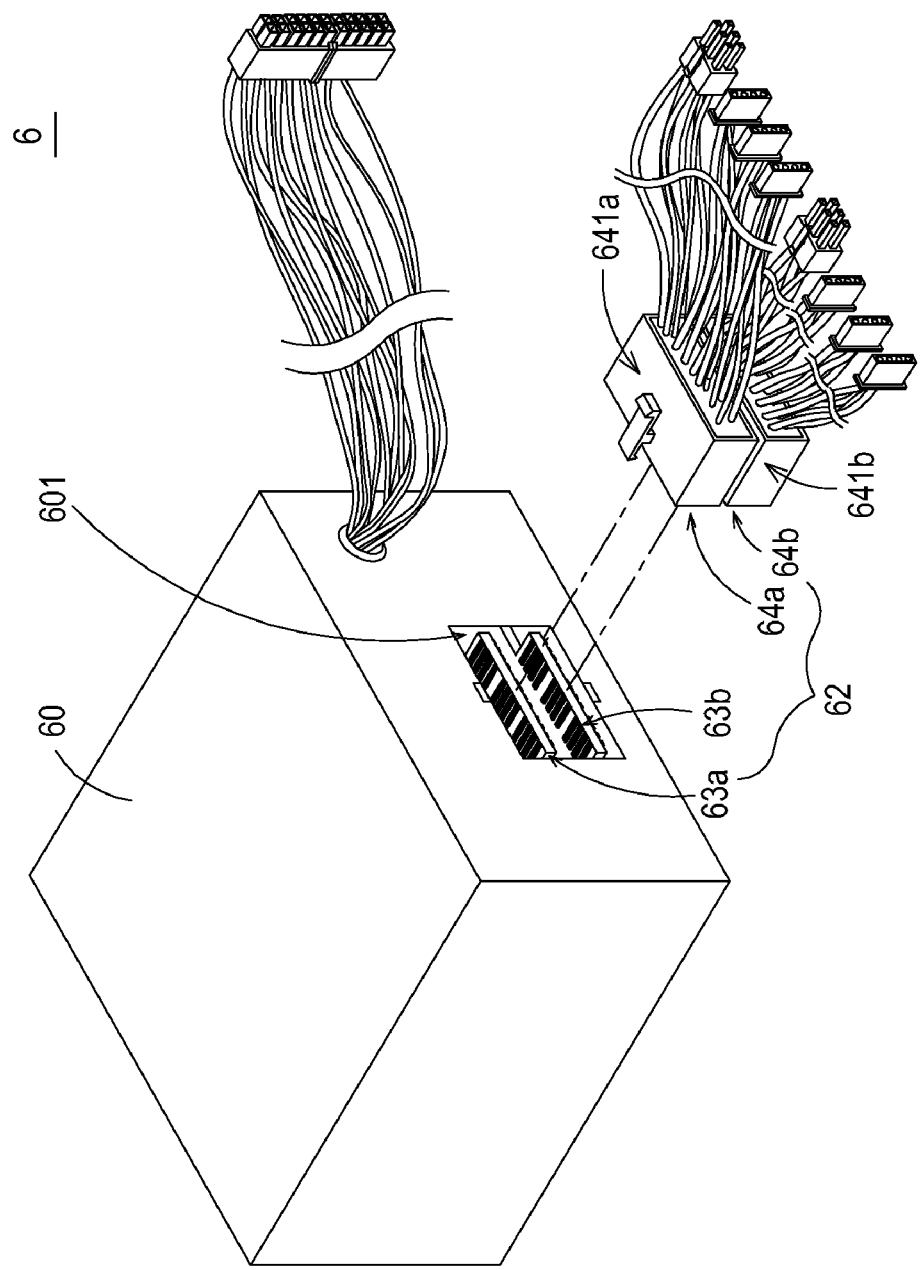
FIG. 6 is a schematic exploded view illustrating a power supply apparatus according to a fourth preferred embodiment of the present invention.

FIG. 6 is a schematic exploded view illustrating a power supply apparatus according to a fourth preferred embodiment of the present invention. The power supply apparatus 6 principally comprises two power converting circuits (not shown), a modular power connection interface 62 and a case 60. The power converting circuits are disposed within the case 60 and mounted on two respective printed circuit boards (not shown). The modular power connection interface 62 comprises two output members 63a and 63b. The output member 63a is horizontally extended from an edge of a first printed circuit board. The output member 63b is horizontally extended from an edge of a second printed circuit board. These two printed circuit boards are electrically connected with each other through a conductive connecting medium (not shown). In this embodiment, these two printed circuit boards are stacked in the vertical direction. Corresponding to the output members 63a and 63b of the modular power connection interface 63, two opens 601 are is formed in a sidewall of the case 20. Through the openings 601, the output members 63a and 63b of the modular power connection interface 62 are exposed outside of the case 60. The first connecting parts 641a/641b of the connecting members 64a/64b are penetrated through the openings 601 and electrically connected with the output members 63a and 63b of the modular power connection interface 63, respectively.

It is known from the fourth preferred embodiment that the number of the output members of the modular power connection interface may be varied according to the practical requirements. As the number of the output members is increased in the vertical direction, the number of corresponding connecting members is increased such that the power supply apparatus may power more electronic devices.

In the above embodiments, the numbers of the output members and the connecting members of the modular power connection interface are not restricted. For example, the modular power connection interface includes one output member and one connecting member (as shown in FIGS. 2 and 4). Alternatively, the modular power connection interface includes multiple output members and multiple connecting members (as shown in FIGS. 5 and 6). The output member may be either disposed inside the case (as shown in FIG. 2) or protruded outside the case (as shown in FIG. 4). In a case that the modular power connection interface includes multiple output members, the arrangements of the output members are not restricted. For example, the output members may be extended from a same edge of a same printed circuit board (as shown in FIG. 5), extended from different edges of a same printed circuit board, or extended from edges of different printed circuit boards. In other words, the configurations of the modular power connection interface are varied according to practical requirements.

In the above embodiments, the second connecting parts of the connecting members of the modular power connection interfaces are illustrated by referring to the same number and the same type. Nevertheless, the number and the type of the second connecting parts of the connecting members are varied depending on the electronic devices of the electronic appliance.

From the above description, the output member of the modular power connection interface of the present invention is a gold finger interface, which is extended from a printed circuit board carrying the power converting circuit. The connecting member of the modular power connection interface includes a first connecting part and several second connecting parts. The connecting member is selected according to the electronic devices of the electronic appliances. As a consequence, the output voltages are transmitted from the power converting circuit to the electronic devices through the output member and the connecting member so as to power the electronic devices.

In a case that the electronic devices contained in the electronic appliance are changed or expanded, the connecting member of the modular power connection interface may be replaced with a new one. The first connecting part and the second connecting parts of the connecting member are electrically connected to the output member and the electronic devices, respectively. Since the connecting member of the modular power connection interface of the present invention is replaceable, the flexibility of using the modular power connection interface is enhanced.

Since the output member of the modular power connection interface of the present invention is a gold finger interface at an edge of the printed circuit board, the output member may be exposed outside the opening of the case or protruded outside the case to be coupled with the first connecting part of the connecting member. Since no addition wires are required to transmit the electricity of the power converting circuit to outside of the case, the power supply apparatus of the present invention is cost-effective.

Moreover, since the output member is electrically connected with the power converting circuit through the trace patterns on the daughter board and the printed circuit board, the problem of causing energy loss at the welding portion encountered from the prior art will be overcome. Under this circumstance, the process of welding the wires on the predetermined location of the printed circuit board is exempted and thus the fabricating process of the power supply apparatus is simplified. Since the welding points on the printed circuit board are reduced, the power loss is decreased and the efficiency of the power supply apparatus is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A power supply apparatus disposed in an electronic appliance with multiple electronic devices, said power supply apparatus comprising:
  a power converting circuit for converting an input voltage into several output voltages required for powering corresponding electronic devices;
  a modular power connection interface comprising:
    an output member comprising a plurality of pins and a daughter board, wherein said pins are arranged on at least one surface of said daughter board and electrically connected to said power converting circuit so as to transmit said output voltages; and
    a connecting member mating with said electronic devices, and having a first connecting part corresponding to said output member and multiple second connecting parts corresponding to said electronic devices, wherein said first connecting part is electrically connected with said pins of said output member, and said second connecting parts are electrically connected with corresponding electronic devices, so that said output voltages are transmitted from said power converting circuit to said electronic devices through said output member and said connecting member; and
  a case comprising an opening corresponding to said output member of said modular power connection interface, an extension piece extended from an edge of said opening and toward inside of said case, and a first hole formed in said case and adjacent to said opening.

2. The power supply apparatus according to claim 1 wherein said output member of said modular power connection interface includes a first surface and a second surface opposed to said first surface, and said pins are disposed on said first surface and/or said second surface.

3. The power supply apparatus according to claim 1 wherein said power converting circuit is mounted on a printed circuit board, and said daughter board of said output member of said modular power connection interface is horizontally extended from an edge of said printed circuit board and integrally formed with said printed circuit board.

4. The power supply apparatus according to claim 3 wherein said printed circuit board and said daughter board are disposed within said case.

5. The power supply apparatus according to claim 1 wherein said case further comprises
  a second hole formed in said extension piece.

6. The power supply apparatus according to claim 5 wherein said first connecting part of said connecting member further comprises:
  a main body comprising a receiving recess for receiving said daughter board of said output member therein; and multiple conducting parts formed on inner walls of said receiving recess and electrically connected to said pins of said output member.

7. The power supply apparatus according to claim 6 wherein said first connecting part of said connecting member further comprises a resilient hooking element, and said resilient hooking element comprises:
   a slab disposed on said main body; and
   a hook extended from an end of said slab, wherein said slab is through said first hole of said case and said hook is engaged with said second hole in said extension piece of said case when said first connecting part of said connecting member is embedded into said opening and coupled with said output member.

8. The power supply apparatus according to claim 4 wherein said output member of said modular power connection interface is protruded outside said case.

9. The power supply apparatus according to claim 3 further comprising a fixed power output interface, wherein said fixed power output interface comprises multiple power wires and an insertion element, said power wires have first terminals welded on a predetermined location of said printed circuit board and second terminals connected to said insertion element.

10. The power supply apparatus according to claim 1 wherein said first connecting part and said second connecting parts of said connecting member of said modular power connection interface are electrically connected with each other through wires.

11. The power supply apparatus according to claim 1 wherein said second connecting parts of said connecting member of said modular power connection interface includes multiple insertion elements.

12. A modular power connection interface for use in a power supply apparatus, said power supply apparatus being electrically connected with multiple electronic devices of an electronic appliance, said power supply apparatus having a power converting circuit for converting an input voltage into several output voltages required for powering corresponding electronic devices, and modular power connection interface comprising:
   an output member comprising a plurality of pins and a daughter board, wherein said pins are arranged on at least one surface of said daughter board and electrically connected to said power converting circuit so as to transmit said output voltages; and
   a connecting member mating with said electronic devices, and having a first connecting part corresponding to said output member and multiple second connecting parts corresponding to said electronic devices, wherein said first connecting part is electrically connected with said pins of said output member, and said second connecting parts are electrically connected with corresponding electronic devices, so that said output voltages are transmitted from said power converting circuit to said electronic devices through said output member and said connecting member;
   wherein said power supply apparatus has a case comprising an opening corresponding to said output member of said modular power connection interface, an extension piece extended from an edge of said opening and toward inside of said case, and a first hole formed in said case and adjacent to said opening.

13. The modular power connection interface according to claim 12 wherein said output member of said modular power connection interface includes a first surface and a second surface opposed to said first surface, and said pins are disposed on said first surface and/or said second surface.

14. The modular power connection interface according to claim 12 wherein said power converting circuit is mounted on a printed circuit board, and said daughter board of said output member of said modular power connection interface is horizontally extended from an edge of said printed circuit board and integrally formed with said printed circuit board.

15. The modular power connection interface according to claim 14 wherein said printed circuit board and said daughter board are disposed within said case.

16. The modular power connection interface according to claim 12 wherein said case further comprises
   a second hole formed in said extension piece.

17. The modular power connection interface according to claim 16 wherein said first connecting part of said connecting member further comprises:
   a main body comprising a receiving recess for receiving said daughter board of said output member therein; and
   multiple conducting parts formed on inner walls of said receiving recess and electrically connected to said pins of said output member.

18. The modular power connection interface according to claim 17 wherein said first connecting part of said connecting member further comprises a resilient hooking element, and said resilient hooking element comprises:
   a slab disposed on said main body; and
   a hook extended from an end of said slab, wherein said slab is through said first hole of said case and said hook is engaged with said second hole in said extension piece of said case when said first connecting part of said connecting member is embedded into said opening and coupled with said output member.

19. The modular power connection interface according to claim 15 wherein said output member of said modular power connection interface is protruded outside said case.

20. The modular power connection interface according to claim 12 wherein said first connecting part and said second connecting parts of said connecting member of said modular power connection interface are electrically connected with each other through wires, and said second connecting parts of said connecting member of said modular power connection interface includes multiple insertion elements.

* * * * *